(12) United States Patent
Park et al.

(10) Patent No.: US 11,847,830 B2
(45) Date of Patent: Dec. 19, 2023

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Myoung Soo Park, Yongin-si (KR); Woo Kuen Kim, Seoul (KR); Jin Gu Kwon, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 886 days.

(21) Appl. No.: 16/788,666

(22) Filed: Feb. 12, 2020

(65) Prior Publication Data

US 2021/0107375 A1 Apr. 15, 2021

(30) Foreign Application Priority Data

Oct. 10, 2019 (KR) ........................ 10-2019-0125052

(51) Int. Cl.
*G06V 20/56* (2022.01)
*B60L 53/80* (2019.01)
(Continued)

(52) U.S. Cl.
CPC ............... *G06V 20/56* (2022.01); *B60L 1/00* (2013.01); *B60L 53/80* (2019.02); *B60L 58/18* (2019.02)

(58) Field of Classification Search
CPC ............ G06V 20/56; B60L 1/00; B60L 53/80
(Continued)

(56) References Cited

U.S. PATENT DOCUMENTS

| 7,110,570 B1* | 9/2006 | Berenz | G06V 40/16 |
| | | | 382/104 |
| 9,623,754 B2* | 4/2017 | Izumi | B60L 3/04 |

(Continued)

FOREIGN PATENT DOCUMENTS

| KR | 20140128834 B1 * | 11/2014 | |
| KR | 20180047896 A1 * | 5/2018 | ............. B60L 50/64 |
| KR | 20140128834 B1 * | 6/2020 | |

OTHER PUBLICATIONS

Machine translaion Cheol et al. , KR20180047896 May 2018.*
(Continued)

*Primary Examiner* — Jacob S. Scott
*Assistant Examiner* — Michael E Butler
(74) *Attorney, Agent, or Firm* — LEMPIA SUMMERFIELD KATZ LLC

(57) ABSTRACT

When a main power from a main battery of a vehicle is interrupted (or cut off), an auxiliary power supplied from an auxiliary battery may be used to drive electrical components of the vehicle. The vehicle includes: a main battery to supply the main power; the auxiliary battery to supply an auxiliary power; and an image recording controller to operate with the main power, capture and record an image of surroundings of the vehicle. In particular, when the supply of the main power is interrupted, the image recording controller performs capturing and recording the image by receiving the auxiliary power, controls a supply path of the auxiliary power so that the auxiliary power is supplied to a predetermined electrical component of the vehicle to continuously operate the predetermined electrical component using the auxiliary power.

14 Claims, 3 Drawing Sheets

(51) Int. Cl.
  *B60L 1/00* (2006.01)
  *B60L 58/18* (2019.01)
(58) Field of Classification Search
  USPC .......................................................... 701/22
  See application file for complete search history.

(56) References Cited

U.S. PATENT DOCUMENTS

| | | | |
|---|---|---|---|
| 11,239,671 B2* | 2/2022 | Yamaguchi | H02J 7/0048 |
| 2007/0262649 A1* | 11/2007 | Ozawa | B60R 16/03 |
| | | | 307/64 |
| 2018/0178775 A1* | 6/2018 | Ono | B60L 1/003 |

OTHER PUBLICATIONS

Machine translaion Woo, KR 20140128834 A,, Nov. 2014.*
Machine translaion Cheol et al. , KR20180047896 May 2018 (Year: 2018).*
Machine translaion Woo, KR 20140128834 A,, Nov. 2014 (Year: 2014).*

* cited by examiner

VEHICLE AND METHOD OF CONTROLLING THE SAME

CROSS-REFERENCE TO RELATED APPLICATION

This application claims priority to and the benefit of Korean Patent Application No. 10-2019-0125052, filed on Oct. 10, 2019, the entire contents of which are incorporated herein by reference.

FIELD

The present disclosure relates to a vehicle, and more particularly, to power control of the vehicle.

BACKGROUND

The statements in this section merely provide background information related to the present disclosure and may not constitute prior art.

A vehicle is equipped with a battery as a power source for ignition of an engine and for driving electrical components.

A typical vehicle battery is equipped with a single battery on one side of an engine room to supply power to an engine ignition device and various electrical components of the vehicle. In the vehicle, the engine is ignited, various kinds of lights are turned on, and a multimedia apparatus is operated using the power supplied from the single battery.

However, we have discovered that when power supply from the single battery is interrupted during the vehicle operation, it is impossible to start the engine of the vehicle and to operate the various electrical components. In particular, when an emergency situation occurs and the power supply from the battery is interrupted, no action requiring battery power can be taken to deal with the emergency situation and then passengers of the vehicle may be in a more difficult situation.

SUMMARY

The disclosure provides a vehicle capable of driving electrical components of the vehicle using auxiliary power supplied from an auxiliary battery when the supply of main power from a main battery of the vehicle is interrupted (or cut off), and a method of controlling the vehicle. Here, the auxiliary battery, which is separate from the main battery, is the auxiliary battery that is additionally installed to provide an operation of an image recording apparatus built in the vehicle by a vehicle manufacturer in a production stage of the vehicle. Instead of adding a separate auxiliary battery, the auxiliary battery provided as a backup power source for an in-vehicle image recording apparatus is also used as a backup for driving the other electrical components in an emergency situation.

Additional aspects of the disclosure will be set forth in part in the description which follows and, in part, will be obvious from the description, or may be learned by practice of the disclosure.

In accordance with an aspect of the disclosure, a vehicle includes: a main battery configured to supply a main power; an auxiliary battery configured to supply an auxiliary power; and an image recording controller configured to: operate with the main power, capture and record an image of surroundings of the vehicle, and when the supply of the main power is interrupted, perform capturing and recording the image by receiving the auxiliary power from the auxiliary battery. The image recording controller may be configured to: when the supply of the main power is interrupted, control a supply path of the auxiliary power so that the auxiliary power is supplied to a predetermined electrical component of the vehicle, and continuously perform an operation of the predetermined electrical component using the auxiliary power while the supply of the main power is interrupted.

In one form, the vehicle may further include a collision sensor configured to detect a collision of the vehicle; and an airbag controller configured to generate a collision detection signal based on a detection result of the collision sensor. The image recording controller may be configured to control the supply path of the auxiliary power so that the auxiliary power is supplied to the predetermined electrical component of the vehicle when it is determined that the supply of the main power is interrupted in a state where the collision detection signal is generated.

In another form, the vehicle may further include an acceleration sensor coupled to the image recording controller to communicate with the image recording controller. The image recording controller may be configured to determine whether the vehicle collides based on at least one of the generated collision detection signal or a detection result of the acceleration sensor.

The predetermined electrical component may be configured to perform safety measures for the safety of passengers of the vehicle.

The predetermined electrical component may be an electric seat in which a seat position is adjusted using power of a motor. The image recording controller may be configured to supply the auxiliary power to the electric seat to perform a position adjustment of the electric seat when the supply of the main power is interrupted when a collision of the vehicle occurs.

The predetermined electrical component may be a communicator which is arranged to make an automatic call connection to a predetermined place. The image recording controller may be configured to supply the auxiliary power to the communicator to perform an emergency call of the communicator when the supply of The predetermined electrical component may be a hybrid controller configured to control a motor and an engine of a hybrid vehicle when the vehicle is the hybrid vehicle. The image recording controller may be configured to supply the auxiliary power to the hybrid controller to control the motor and the engine by the hybrid controller when the supply of the main power is interrupted when a collision of the vehicle occurs.

In accordance with another aspect of the disclosure, a vehicle includes: a main battery configured to supply a main power; an auxiliary battery configured to supply an auxiliary power; an image recording controller configured to: operate by receiving the main power, capture and record an image of surroundings of the vehicle, and perform capturing and recording the images by receiving the auxiliary power from the auxiliary battery when the supply of the main power is interrupted; and a collision detector configured to generate a collision detection signal when a collision of the vehicle occurs. The image recording controller may be configured to, when the collision detection signal is generated, identify whether the supply of the main power is interrupted, when the supply of the main power is interrupted, control a supply path of the auxiliary power so that the auxiliary power is supplied to a predetermined electrical component to perform safety measures for the safety of passengers of the vehicle, and to continuously perform an operation of the predetermined electrical component using the auxiliary power while the supply of the main power is interrupted.

The collision detector may include a collision sensor configured to detect the collision of the vehicle; and an airbag controller configured to generate the collision detection signal based on a detection result of the collision sensor.

The collision detector may further include an acceleration sensor coupled to the image recording controller to communicate with the image recording controller.

The predetermined electrical component may be an electric seat in which a seat position is adjusted using power of a motor. The image recording controller may be configured to supply the auxiliary power to the motor to perform a position adjustment of the electric seat when the collision of the vehicle occurs and the supply of the main power is interrupted.

The predetermined electrical component may be a communicator which is arranged to make an automatic call connection to a predetermined place. The image recording controller may be configured to supply the auxiliary power to the communicator to perform an emergency call of the communicator when the supply of the main power is interrupted when the collision of the vehicle occurs.

The predetermined electrical component may be a hybrid controller configured to control a motor and an engine of a hybrid vehicle when the vehicle is the hybrid vehicle. The image recording controller may be configured to supply the auxiliary power to the hybrid controller to control the motor and the engine by the hybrid controller when the supply of the main power is interrupted when the collision of the vehicle occurs.

In accordance with another aspect of the disclosure, a method of controlling a vehicle is provided, where the vehicle includes: a main battery configured to supply a main power, an auxiliary battery configured to supply an auxiliary power, and an image recording controller configured to operate with the main power, to capture and record an image of surroundings of the vehicle, and to perform a capturing and recording images by receiving the auxiliary power when the supply of the main power is interrupted. The method includes: when the supply of the main power is interrupted, operating the image recording controller with the auxiliary power; identifying, by the image recording controller, whether the supply of the main power is interrupted; when the supply of the main power is interrupted, controlling, by the image recording controller, a supply path of the auxiliary power so that the auxiliary power is supplied to a predetermined electrical component of the vehicle; and continuously performing, by the image recording controller, an operation of the predetermined electrical component using the auxiliary power while the supply of the main power is interrupted.

In another form, the method may further include: generating, by a collision detector, a collision detection signal when a collision of the vehicle occurs; setting, by the image recording controller, the supply path of the auxiliary power to the predetermined electrical component of the vehicle when the collision detection signal is generated and the supply of the main power is interrupted.

The predetermined electrical component may be an electric seat in which a seat position is adjusted using power of a motor. The image recording controller may be configured to supply the auxiliary power to the motor to perform a position adjustment of the electric seat when a collision of the vehicle occurs and the supply of the main power is interrupted.

The predetermined electrical component may be a communicator which is arranged to make an automatic call connection to a predetermined place. The image recording controller may be configured to supply the auxiliary power to the communicator to perform an emergency call of the communicator when the supply of the main power is interrupted when a collision of the vehicle occurs.

The predetermined electrical component may be a hybrid controller configured to control a motor and an engine of a hybrid vehicle when the vehicle is the hybrid vehicle. The image recording controller may be configured to supply the auxiliary power to the hybrid controller to control the motor and the engine by the hybrid controller when the supply of the main power is interrupted when a collision of the vehicle occurs.

In accordance with another aspect of the disclosure, a vehicle includes: a main battery configured to supply a main power; an auxiliary battery configured to supply an auxiliary power; a collision detector configured to detect a collision of the vehicle; and an image recording controller configured to operate with the main power, to capture and record an image of surroundings of the vehicle, and to perform a capturing and recording the image by receiving the auxiliary power when the supply of the main power is interrupted. The image recording controller may be configured to, when the supply of the main power is interrupted in a state where the collision of the vehicle occurs, control a supply path of the auxiliary power so that the auxiliary power is supplied to an electric seat of the vehicle, and to change a seat position of the electric seat using the auxiliary power while the supply of the main power is interrupted.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
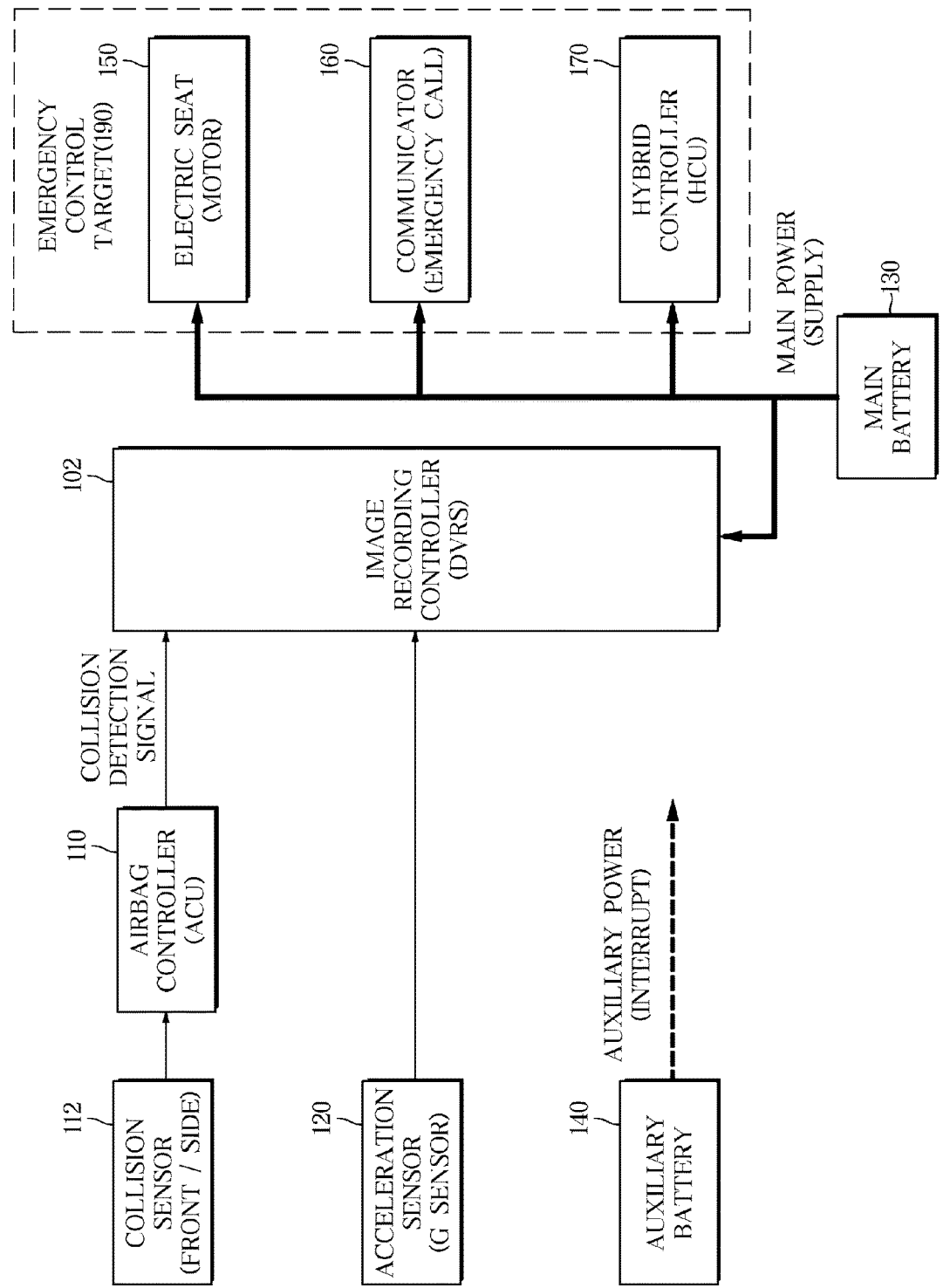
FIG. 1 is a view illustrating a control system of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a view illustrating a control system of a vehicle according to an exemplary forms of the disclosure.

Referring to FIG. 1, when the supply of a main power supplied from a main battery 130 is interrupted when a collision of a vehicle is detected, an image recording controller 102 may supply an auxiliary power supplied from an auxiliary battery 140 to an emergency control target 190 to allow an emergency control for the safety of passengers. The image recording controller 102 may operate as a controller that controls this series of operations.

The image recording controller 102 may be the controller of an image recording apparatus provided to capture the front and rear of the vehicle and record an image in a memory. The image recording apparatus is an apparatus (DVRS, Drive Video Record System) built in of the vehicle by a vehicle manufacturer in a production stage of the vehicle, which is connected to communicate with the other electrical components and Electronic Control Units (ECUs) of the vehicle through a control area network (CAN) and is provided to cooperate with each other organically. The image recording controller 102 may be provided to control the operation of the image recording apparatus. The image recording apparatus is distinguished from the image recording apparatus (also called a 'black box') installed by a user after the vehicle is shipped. The auxiliary battery 140 may be the auxiliary battery additionally installed to provide the operation of an in-vehicle image recording apparatus. Therefore, in an form of the disclosure, the auxiliary battery provided as a backup power source of the in-vehicle image recording apparatus that is already provided in a vehicle is also used as the backup power source for driving the other electrical components in an emergency situation.

The image recording controller 102 may capture the front and rear of the vehicle and record the image when a predetermined event occurs. The predetermined event may be, for example, driving, parking, or external impact detection. To this end, the image recording controller 102 may communicate with the other components of the vehicle through the CAN of the vehicle. The other components with which the image recording controller 102 communicates may be, for example, audio/video/navigation (AVN) or the ECU.

The image recording controller 102 may be connected in communication with an acceleration sensor 120, which is a means for detecting external impacts to the vehicle. That is, when a detection value of the acceleration sensor 120 exceeds a predetermined level or more, the image recording controller 102 may recognizes this as an occurrence of an external impact event and perform image capturing and recording.

The acceleration sensor 120 may be collectively referred to as a 'collision detector' together with a collision sensor 112 and an airbag controller 110 which will be described later.

The image recording controller 102 may basically operate by receiving power from the main battery 130. The main battery 130 may be a battery that is provided to supply power to an ignition device at a start of an engine and to power desired for various electrical components of the vehicle. The image recording controller 102 may be operated by receiving power from the main battery 130. When the vehicle is parked for a long time, the power of the main battery 130 is consumed for image capturing and recording of the image recording controller 102 (discharge). In order to prepare for a situation where the power of the main battery 130 is exhausted as described above, the auxiliary battery 140 may be connected to the image recording controller 102. The auxiliary battery 140, which is separate from the main battery 130, may supply the auxiliary power even when supply of the main power from the main battery 130 is interrupted (or cut off). Therefore, if the power is not supplied from the main battery 130, the image recording controller 102 may continue to operate by receiving the auxiliary power from the auxiliary battery 140.

In FIG. 1, representing that the power (dashed arrow) of the auxiliary battery 140 does not reach to the image recording controller 102 means that the power of the auxiliary battery 140 is connected to the image recording controller 102 but the image recording controller 102 in not using the auxiliary power of the auxiliary battery 140. The image recording controller 102 is using the main power of the main battery 130, and if the power supply from the main battery 130 is interrupted (or cut off), the image recording controller 102 may immediately use the auxiliary power supplied from the auxiliary battery 140.

The auxiliary power of the auxiliary battery 140 may also be supplied to the emergency control target 190 under the control of the image recording controller 102. This will be described in more detail with reference to FIGS. 2 and 3 to be described later.

The airbag controller 110 (ACU, Airbag Control Unit) may be provided to control the deployment of an airbag mounted on the vehicle. That is, when the vehicle collides with another vehicle or structures, and the impact is applied to the vehicle by a predetermined size or more, the airbag controller 110 may deploy the airbag to protect the passenger in response to the impact applied to the vehicle. The airbag controller 110 may detect the impact applied to the vehicle through the collision sensor 112. The collision sensor 112 may include an impact sensor such as a frontal impact sensor (FIS) and a side impact sensor (SIS).

The collision sensor 112 and the airbag controller 110 may be collectively referred to as the 'collision detector' together with the acceleration sensor 120 described above.

When the impact of the predetermined level or more applied to the vehicle through the collision sensor 112 is detected, the airbag controller 110 may generate a collision detection signal to deploy the airbag, and may transmit the collision detection signal to the image recording controller 102. In the foregoing, the image recording controller 102 has been described to detect the impact applied to the vehicle through the acceleration sensor 120. Accordingly, the image recording controller 102 may determine whether the vehicle collides using at least one of the collision detection signal transmitted from the airbag controller 110 and a detection result of the acceleration sensor 120. In one form, in order to more accurately determine whether the vehicle collides, both the collision detection signal transmitted from the airbag controller 110 and the detection result of the acceleration sensor 120 are used.

The emergency control target 190 may be a component that urgently needs control for safety measures in order to promote safety of the passengers in case of an emergency situation. Examples of the emergency control target 190 may include an electric seat 150, a communicator 160, the hybrid controller 170, and the like. The electric seat 150, the communicator 160, the hybrid controller 170, and the like are merely forms of the emergency control target 190, and the emergency control target 190 is not limited to the electric seat 150, the communication unit 160, the hybrid controller 170, and the like. In addition, the auxiliary power of the auxiliary battery 140 is not necessarily supplied only to the emergency control target 190. The supply of auxiliary power to the emergency control target 190 only gives higher priority to the emergency control target 190 to cope with the emergency situation, and if an amount of power reserve of the auxiliary battery 140 is sufficient, the auxiliary power of the auxiliary battery 140 may be supplied to the other electrical components other than the emergency control target 190.

The electric seat 150 is a seat which can adjust a position using the power of a motor. For example, the passenger may easily and conveniently adjust the front and rear positions, a back angle, a height, and the like of the electric seat 150 only by operating a related button of the electric seat 150. However, since the electric seat 150 uses the power of the motor, it operates normally only when the power is supplied from the outside. To this end, the electric seat 150 is basically operated by receiving the power from the main battery 130. When the power supply from the main battery 130 that supplies the power to the motor of the electric seat 150 is interrupted (or cut off), the passenger cannot adjust the electric seat 150. In the form of the disclosure, when the power supply from the main battery 130 is interrupted (or cut off), the image recording controller 102 may control an auxiliary power supply path so that the power of the auxiliary battery 140 is supplied to the electric seat 150 so that the electric seat 150 can operate normally using the power of the auxiliary battery 140. For example, when the vehicle collides, a space between a driver's seat and a front dashboard is so narrow that the passengers move away from the vehicle, the driver's seat may need to be moved backward to secure the space. At this time, if the power is not supplied to the driver's seat, which is the electric seat, it may be difficult to secure the space to escape from the driver's seat because the driver's seat does not slide backward even if a driver operates the button. In the form of the disclosure, in the emergency situation, when the passenger needs to move (slid) the position of the electric seat 150 rearward in order to move away from the vehicle, even if the supply of main power from the main battery 130 is interrupted (or cut off), the electric seat 150 may operate normally by supplying auxiliary power of the auxiliary battery 140 to the electric seat 150 through the image recording controller 102 so that the passenger can escape from the emergency situation.

The communicator 160 may be a device provided to connect the vehicle and an external communication network. The passenger of the vehicle may use an internet service, a telematics service, a wireless communication service, etc. through the communicator 160. In particular, an emergency call service that can automatically make an emergency call to a predetermined place (hospital, police station, insurance company, etc.) when the emergency situation occurs is also made through communicator 160. The communicator 160 may also basically operate by receiving the power from the main battery 130. When the power supply from the main battery 130 that supplies the power to the communicator 160 is interrupted (or cut off), the emergency call as well as general communication are impossible. In the form of the disclosure, when the power supply from the main battery 130 is interrupted (or cut off), the image recording controller 102 may control the auxiliary power supply path so that the power of the auxiliary battery 140 is supplied to communicator 160 so that the communicator 160 can operate normally using the power of the auxiliary battery 140.

The hybrid controller 170 may be provided to control characteristic functions unique to a hybrid vehicle. In particular, the hybrid controller 170 is involved in starting the motor and ignition of the engine, etc., both the starting of the motor and the ignition of the engine require the power. Therefore, the hybrid controller 170 may also basically operate by receiving the power from the main battery 130. When the power supply from the main battery 130 that supplies the power to the motor of the electric seat 150 is interrupted (or cut off), the passenger cannot adjust the electric seat 150. In the form of the disclosure, when the power supply from the main battery 130 is interrupted (or cut off), the image recording controller 102 may control the auxiliary power supply path so that the power of the auxiliary battery 140 is supplied to the electric seat 150 so that the electric seat 150 can operate normally using the power of the auxiliary battery 140.

Figure 2:
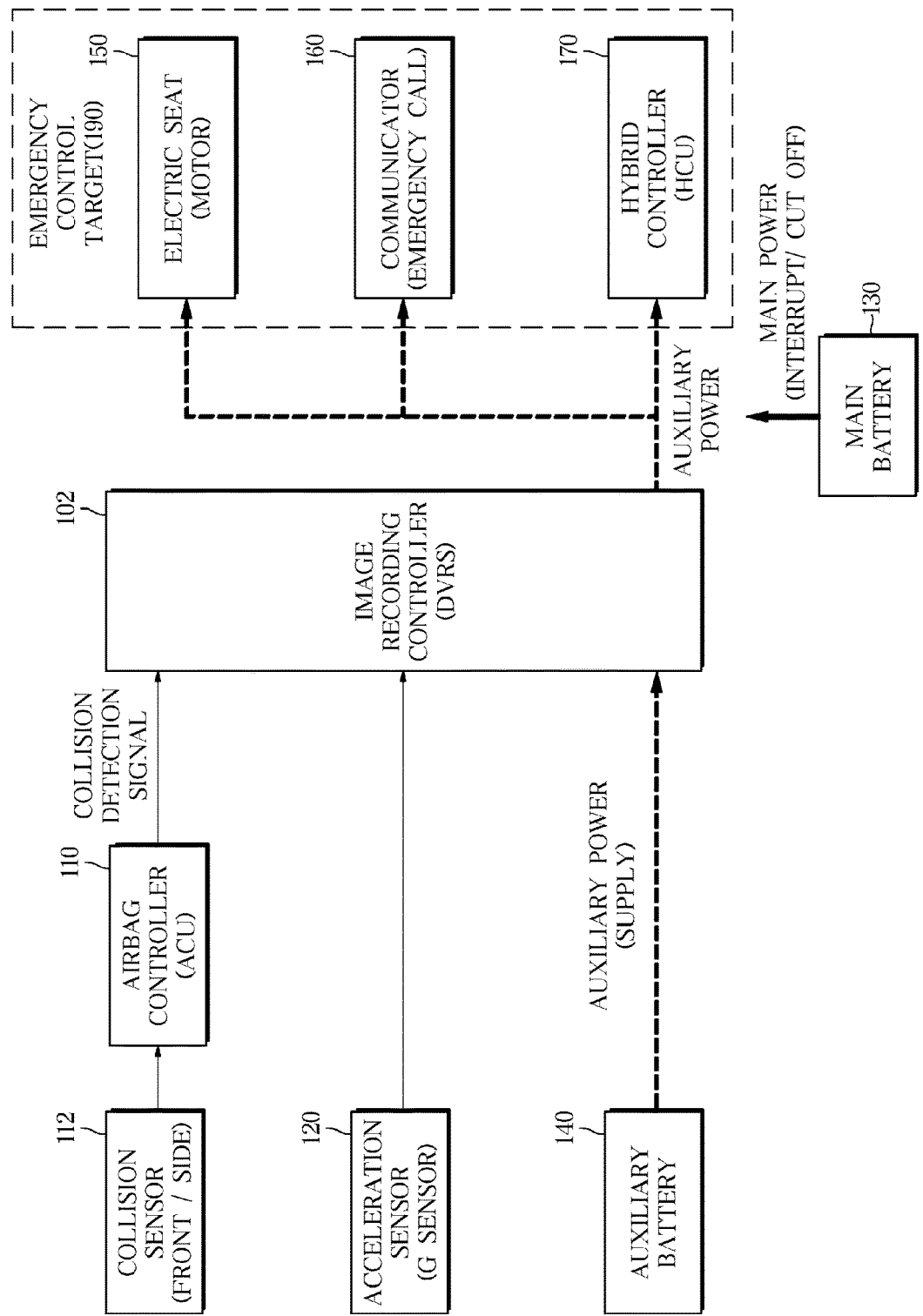
FIG. 2 is a view illustrating a power supply state of an auxiliary battery when power supply is interrupted (or cut off) from a main battery in a vehicle.

FIG. 2 is a view illustrating a power supply state of an auxiliary battery when power supply is interrupted (or cut off) from a main battery in a vehicle according to exemplary forms of the disclosure.

A situation of FIG. 2 assumes a situation in which the various electrical components that are operated by being received with the main power are not operated because the supply of the main power from the main battery 130 is interrupted (or cut off).

For example, the various electrical components may not receive the main power from the main battery 130 when the collision of the vehicle occurs and a cable of an output side of the main battery 130 is damaged.

In the situation, the image recording controller 102 may determine whether the vehicle collides using at least one of the collision detection signal transmitted from the airbag controller 110 and the detection result of the acceleration sensor 120. The image recording controller 102 may identify that the supply of the main power from the main battery 130 is interrupted (or cut off), and then control an power supply path of the auxiliary battery 140 such that the auxiliary power of the auxiliary battery 140 is supplied to the electric seat 150, the communicator 160, and the hybrid controller 170, which are the emergency control target 190.

As illustrated in FIG. 2, even when the supply of the main power from the main battery 130 is interrupted (or cut off), as the auxiliary power (dashed arrow) of the auxiliary battery 140 is supplied to the emergency control target 190 under the control of the image recording controller 102, the components of the emergency control target 190 may operate normally using the auxiliary power of the auxiliary battery 140.

Figure 3:
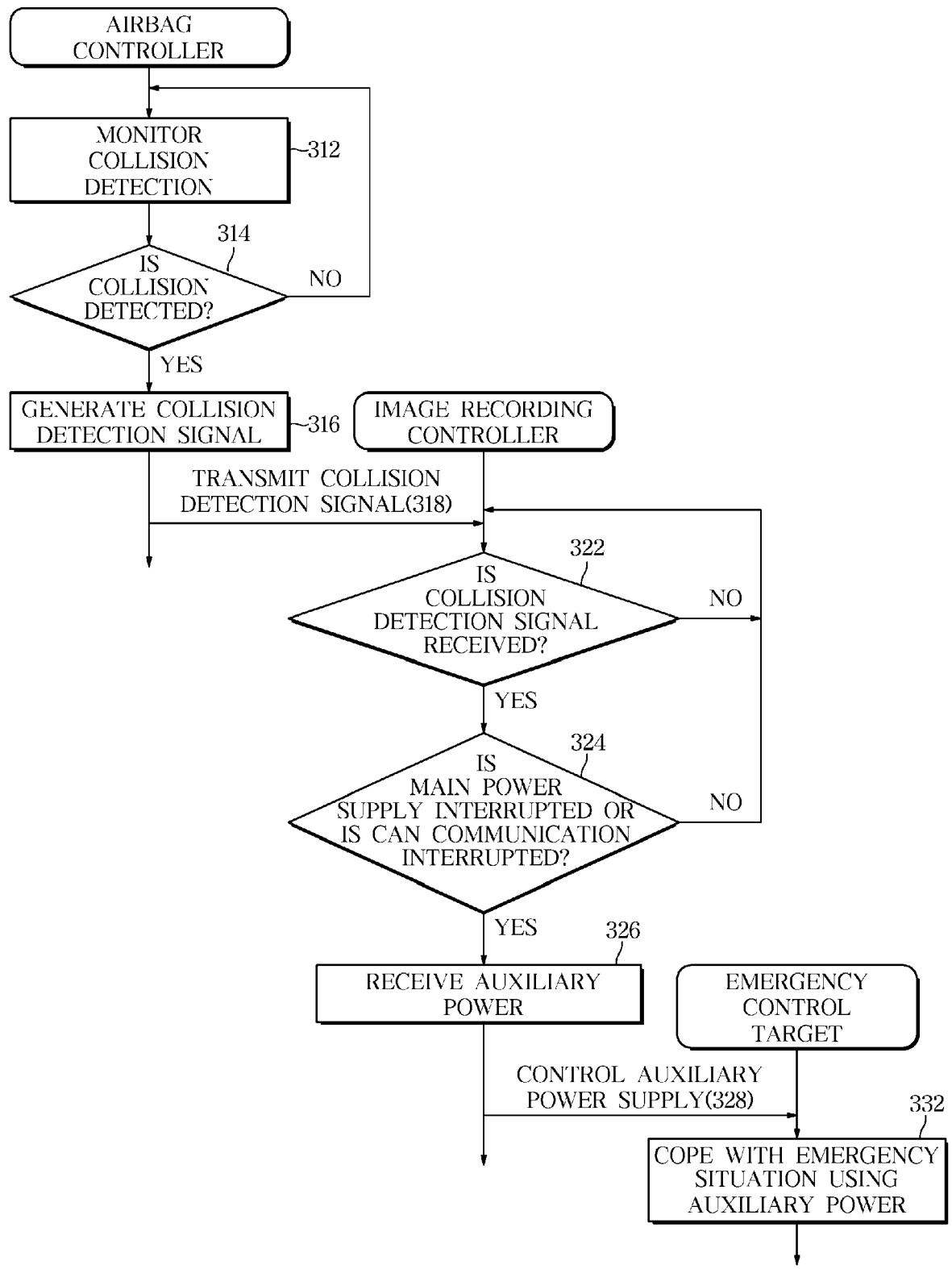
FIG. 3 is a flowchart illustrating a method of controlling a vehicle.

FIG. 3 is a view illustrating a method of controlling a vehicle according to exemplary forms of the disclosure. In a method of controlling the vehicle illustrated in FIG. 3, when the supply of the main power supplied from the main battery 130 is interrupted when the collision of the vehicle is detected, the emergency control for the safety of the passengers may be performed by supplying the auxiliary power supplied from the auxiliary battery 140 to the emergency control target 190.

The airbag controller 110 may monitor the collision of the vehicle through the collision sensor 112 (312).

When the impact of the predetermined level or more applied to the vehicle through the collision sensor 112 is detected (YES in 3124), the airbag controller 110 may generate the collision detection signal (316). The generated collision detection signal may be used for deployment of the airbag.

In addition, the airbag controller 110 may transmit the generated collision detection signal to the image recording controller 102 (318). The image recording controller 102 may determine that a collision situation has occurred in the vehicle through the collision detection signal transmitted from the airbag controller 110. The collision of the vehicle may also be identified through the acceleration sensor 120 connected to the image recording controller 102. Alternatively, both collision detection signal transmitted from the airbag controller 110 and detection result of the acceleration sensor 120 may be used to more accurately determine whether the vehicle collides with each other. When the collision detection signal is received (YES in 322), the image recording controller 102 may identify whether the supply of the main power from the main battery 130 is interrupted (or cut off) or a CAN communication of the vehicle is interrupted. (324). Identifying if the main power supply from the main battery 130 is interrupted (or cut off) is to identify whether the main power is being supplied to the devices that must be powered to provide the safety of the passengers in case of the emergency situation of the vehicle. When the supply of main power is interrupted (or cut off), the image recording controller 102 may supply the auxiliary power of the auxiliary battery 140 instead of the main power so that the auxiliary power can be supplied to devices that must be powered in order to promote safety of the passengers in case of the emergency situation. Identifying whether the CAN communication is blocked by the image recording controller 102 is to determine whether there is an abnormality in a main circuit managing the supply of the main power of the main battery 130, and to identify whether the emergency control target 190 is normally operated (controller) through the abnormality of the main circuit.

When it is determined that main power is not supplied from the main battery 130 due to the collision of the vehicle (YES in 324), the image recording controller 102 may immediately receive the auxiliary power from the auxiliary battery 140 (326). The image recording controller 102 may continuously perform a control operation using the auxiliary power of the auxiliary battery 140 instead of the main power of the main battery 130.

The image recording controller 102 may also perform an auxiliary power supply control to allow the auxiliary power supplied from the auxiliary battery 140 to be supplied to the other electrical components of the vehicle, for example, the emergency control target 190 (328). As mentioned in the description of FIG. 2, when the collision of the vehicle occurs and the cable, such as the output side of the main battery 130 is damaged, the various electrical components cannot receive the main power from the main battery 130. In this case, the image recording controller 102 may control the power supply path of the auxiliary battery 140 to supply the auxiliary power of the auxiliary battery 140 to the electric seat 150, the communicator 160, the hybrid controller 170, and the like, which are the emergency control target 190, whereby the components of the emergency control target 190 may operate normally using the auxiliary power of the auxiliary battery 140.

The components of the emergency control target 190, that is, the electric seat 150, the communicator 160, the hybrid controller 170, and the like, may maintain the operation using the auxiliary power supplied from the auxiliary battery 140 under the control of the image recording controller 102 and perform an emergency response operation considering the safety of the passengers from the collision accident (332). In particular, in the case of the electric seat 150, when the passengers need to move away from the vehicle, when the space between the electric seat 150 and the dashboard is not sufficiently secured, by allowing the seat position of the electric seat 150 to be changed by the auxiliary power of the auxiliary battery 140, it is possible to secure the space for the passengers to escape from the vehicle by changing the seat position of the electric seat 150.

Of course, the other electrical components other than the emergency control target 190 may also perform desired operations using the auxiliary power supplied from the auxiliary battery 140 under the control of the image recording controller 102. However, since a capacity of the auxiliary battery 140 is relatively smaller than that of the main battery 130, when the emergency situation occurs, the higher priority may be given to the emergency control target 190, which contributes to securing the safety of the passengers than the other electrical components, so that the auxiliary power can be used.

According to the vehicle and the method of controlling the vehicle according to the exemplary forms, when the supply of the main power from the main battery of the vehicle is interrupted (or cut off), the auxiliary power supplied from the auxiliary battery may be used to drive the electrical components of the vehicle. Here, the auxiliary battery, which is separate from the main battery, is the auxiliary battery that is additionally installed to provide the operation of the image recording apparatus built in the vehicle by a vehicle manufacturer in the production stage of the vehicle. Instead of adding a separate auxiliary battery, the auxiliary battery provided as the backup power source for the in-vehicle image recording apparatus is also used as the backup for driving the other electrical components in the emergency situation.

The disclosed forms is merely illustrative of the technical idea, and those skilled in the art will appreciate that various modifications, changes, and substitutions may be made without departing from the present disclosure. Therefore, the exemplary forms disclosed above and the accompanying drawings are not intended to limit the technical idea, but to describe the technical spirit, and the scope of the technical idea is not limited by the forms and the accompanying drawings.

What is claimed is:

1. A vehicle comprising:
a main battery configured to supply a main power;
an auxiliary battery configured to supply an auxiliary power; and
an image recording controller configured to:
   operate with the main power,
   capture and record an image of surroundings of the vehicle,
   when supplying the main power by the main battery is interrupted, perform capturing and recording the image with the auxiliary power received from the auxiliary battery, and control a supply path of the auxiliary power so that the auxiliary power is supplied to a predetermined electrical component of the vehicle, and
   continuously perform an operation of the predetermined electrical component using the auxiliary power while the supply of the main power is interrupted,
wherein the predetermined electrical component comprises an electric seat in which a seat position is adjusted using power of a motor, and
wherein the image recording controller is configured to supply the auxiliary power to the electric seat to perform a position adjustment of the electric seat when the supply of the main power is interrupted when a collision of the vehicle occurs.

2. The vehicle according to claim 1, further comprising:
a collision sensor configured to detect the collision of the vehicle; and
an airbag controller configured to generate a collision detection signal based on a detection result of the collision sensor,
wherein the image recording controller is configured to control the supply path of the auxiliary power so that the auxiliary power is supplied to the predetermined electrical component of the vehicle when it is determined that the supply of the main power is interrupted in a state where the collision detection signal is generated.

3. The vehicle according to claim 2, further comprising:
an acceleration sensor coupled to the image recording controller to communicate with the image recording controller,
wherein the image recording controller is configured to determine whether the vehicle collides based on at least one of the generated collision detection signal or a detection result of the acceleration sensor.

4. The vehicle according to claim 1, wherein the predetermined electrical component further comprises a communicator which is arranged to make an automatic call connection to a predetermined place, and
wherein the image recording controller is configured to supply the auxiliary power to the communicator to perform an emergency call of the communicator when the supply of the main power is interrupted when a collision of the vehicle occurs.

5. The vehicle according to claim 1, wherein the predetermined electrical component further comprises a hybrid controller configured to control the motor and an engine of a hybrid vehicle when the vehicle is the hybrid vehicle, and
wherein the image recording controller is configured to supply the auxiliary power to the hybrid controller to control the motor and the engine by the hybrid controller when the supply of the main power is interrupted when the collision of the vehicle occurs.

6. A vehicle comprising:
a main battery configured to supply a main power;
an auxiliary battery configured to supply an auxiliary power;
an image recording controller configured to:
operate with the main power supplied from the main battery,
capture and record an image of surroundings of the vehicle,
when supplying the main power by the main battery is interrupted, perform capturing and recording the image with the auxiliary power supplied from the auxiliary battery; and
a collision detector configured to generate a collision detection signal when a collision of the vehicle occurs;
wherein the image recording controller is configured to:
when the collision detection signal is generated, identify whether the supply of the main power is interrupted;
when the supply of the main power is interrupted, control a supply path of the auxiliary power so that the auxiliary power is supplied to a predetermined electrical component to perform safety measures for safety of passengers of the vehicle; and
continuously perform an operation of the predetermined electrical component using the auxiliary power while the supply of the main power is interrupted,
wherein the predetermined electrical component comprises an electric seat configured to adjust a seat position using power of a motor, and
wherein the image recording controller is configured to supply the auxiliary power to the motor to perform the seat position adjustment of the electric seat when the supply of the main power is interrupted when the collision of the vehicle occurs.

7. The vehicle according to claim 4, wherein the collision detector comprises:

a collision sensor configured to detect the collision of the vehicle; and
an airbag controller configured to generate the collision detection signal based on a detection result of the collision sensor.

8. The vehicle according to claim 7, wherein the collision detector further comprises an acceleration sensor coupled to the image recording controller to communicate with the image recording controller.

9. The vehicle according to claim 6, wherein the predetermined electrical component further comprises a communicator configured to make an automatic call connection to a predetermined place, and
wherein the image recording controller is configured to supply the auxiliary power to the communicator to perform an emergency call of the communicator when the supply of the main power is interrupted when the collision of the vehicle occurs.

10. The vehicle according to claim 6, wherein the predetermined electrical component further comprises a hybrid controller configured to control the motor and an engine of a hybrid vehicle when the vehicle is the hybrid vehicle, and
wherein the image recording controller is configured to supply the auxiliary power to the hybrid controller to control the motor and the engine by the hybrid controller when the supply of the main power is interrupted when the collision of the vehicle occurs.

11. A method of controlling a vehicle, where the vehicle includes: a main battery configured to supply a main power, an auxiliary battery configured to supply an auxiliary power, and an image recording controller configured to operate with the main power to capture and record an image of surroundings of the vehicle and to perform capturing and recording the image with the auxiliary power when the supply of the main power is interrupted, the method comprising:
operating the image recording controller with the main power;
when the supply of the main power is interrupted, operating the image recording controller with the auxiliary power;
identifying, by the image recording controller, whether the supply of the main power is interrupted;
when the supply of the main power is interrupted, controlling, by the image recording controller, a supply path of the auxiliary power so that the auxiliary power is supplied to a predetermined electrical component of the vehicle;
continuously performing, by the image recording controller, an operation of the predetermined electrical component using the auxiliary power while the supply of the main power is interrupted, wherein the predetermined electrical component comprises an electric seat configured to adjust a seat position using power of a motor; and
supplying, by the image recording controller, the auxiliary power to the motor to perform the seat position adjustment of the electric seat when a collision of the vehicle occurs and the supply of the main power is interrupted.

12. The method according to claim 11, further comprising:
generating, by a collision detector, a collision detection signal when the collision of the vehicle occurs,
setting, by the image recording controller, the supply path of the auxiliary power to the predetermined electrical component of the vehicle when the collision detection signal is generated.

13. The method according to claim 11, wherein the predetermined electrical component further comprises a communicator configured to make an automatic call connection to a predetermined place, and wherein the image recording controller is configured to supply the auxiliary power to the communicator to perform an emergency call of the communicator when the collision of the vehicle occurs and the supply of the main power is interrupted.

14. The method according to claim 11, wherein the predetermined electrical component further comprises a hybrid controller configured to control the motor and an engine of a hybrid vehicle when the vehicle is the hybrid vehicle, and wherein the image recording controller is configured to supply the auxiliary power to the hybrid controller to control the motor and the engine by the hybrid controller when the collision of the vehicle occurs and the supply of the main power is interrupted.

* * * * *

UNITED STATES PATENT AND TRADEMARK OFFICE
CERTIFICATE OF CORRECTION

PATENT NO. : 11,847,830 B2
APPLICATION NO. : 16/788666
DATED : December 19, 2023
INVENTOR(S) : Myoung Soo Park et al.

It is certified that error appears in the above-identified patent and that said Letters Patent is hereby corrected as shown below:

In the Claims

Claim 7, Column 11, Line 66 "claim 4" should be replaced with "claim 6"

Signed and Sealed this
Twentieth Day of February, 2024

Katherine Kelly Vidal
*Director of the United States Patent and Trademark Office*